United States Patent [19]

Ammermann

[11] 4,184,550
[45] Jan. 22, 1980

[54] SPRING CUSHION MOUNTING FOR BEET HARVESTING DEVICE

[76] Inventor: Harley Ammermann, Box 526, Clara City, Mich. 56222

[21] Appl. No.: 889,857

[22] Filed: Mar. 24, 1978

[51] Int. Cl.² .................... A01B 61/00; A01D 19/00
[52] U.S. Cl. .................................... 171/58; 172/710
[58] Field of Search ................ 171/58; 230/487, 488, 230/406 A, 186, 483; 172/624, 710, 570, 572, 497, 705

[56] References Cited

U.S. PATENT DOCUMENTS

| | | | |
|---|---|---|---|
| 390,812 | 10/1888 | Stimson | 172/705 |
| 3,084,749 | 4/1963 | Anderson | 172/705 |
| 3,097,705 | 7/1963 | Bopf | 172/710 |
| 3,314,487 | 4/1967 | Kopaska et al. | 172/710 |
| 3,461,967 | 8/1969 | Wills | 171/58 |
| 3,550,865 | 12/1970 | Mackinnon | 280/489 |
| 3,744,572 | 7/1973 | Zeltwanger et al. | 172/710 |
| 3,799,079 | 3/1974 | Dietrich | 172/710 |
| 3,825,073 | 7/1974 | Gardner et al. | 172/710 |
| 3,960,220 | 6/1976 | Laitala | 172/710 |
| 4,005,757 | 2/1977 | Hess | 172/710 |

FOREIGN PATENT DOCUMENTS 638172  5/1950  United Kingdom ............... 172/705

Primary Examiner—Louis G. Mancene
Assistant Examiner—Paul J. Hirsch
Attorney, Agent, or Firm—James R. Cwayna

[57] ABSTRACT

A spring cushioning mounting for beet harvesting devices to permit upward movement of the harvester should the same engage a rock or the like including an attachment, L-shaped member mounted on the carrier for the harvester to engage a tool mounting bar and be received therearound and a pivot secured to the tool mounting bar with the upward leg of the L-shaped member pivotally received therein and spring loading elements connecting the other leg of the L-shaped member with the pivot member to normally bring the L-shaped member into position against the tool bar.

8 Claims, 5 Drawing Figures

SPRING CUSHION MOUNTING FOR BEET HARVESTING DEVICE

FIELD OF THE INVENTION

This invention relates generally to mounting devices for earth working tools or harvesting tools of farm equipment and more particularly to a spring loading mount for a beet harvesting device which will permit upward shifting of the tool should the same strike a the same strike a rock or similar immoveable object.

BACKGROUND AND OBJECTS OF THE INVENTION

The use of spring loaded devices for mounting earth working tools upon or to be carried by tool bars is well known in the prior art. Such art extends back to the use of spring loaded harrows or rakes and disc plows and includes, in this field, prior art patents to Anderson et al, U.S. Pat. No. 889,885; Stimson, U.S. Pat. No. 390,812 and Gardner, U.S. Pat. No. 3,825,073. Similar references include specific application devices which incorporate spring loading units such as the reference to Dietrich.

In applicant's analysis of these references and to the extent he is aware of the available commercial art, all of these devices have one common fault. This fault for which no provision is made is the lateral instability of the article.

In the harvesting of sugar beets or similar row crop article, the crop is specifically planted in carefully spaced rows and the harvesting must, of course, be made in accordance therewith. The harvesting of sugar beets is accomplished by providing a pair of angularly arranged wheels with the narrow dimension occurring when the wheels are at ground or picking level thus engaging the beet and pulling the same from the ground. As the wheel rotates, the beet is carried upwardly and at the upper rotation position the wheels are at their greatest spaced dimension and a reversally rotating paddle wheel assists in dislodging the beet from the picking wheels and directing the same rearwardly to the further gathering and cleaning equipment.

It should be obvious that lateral stability and guiding for these wheels is essential to, not only insure the alignment for picking but to prevent injury to any beets that would occur if the wheel were to ride over the beet.

The requirement for cushioning such a device and for permitting its upward movement should be obvious. Normally several of such picking devices are mounted transversally to the movement of the propelling vehicle on a common tool bar. If such cushioning were not provided, any upward forces due to hitting a rock or the like would be transmitted to this bar and this could result in, not only damage to the bar but also in disruption of the position of the other pickers.

It is therefore an object of applicant's invention to provide a cushioning mounting for beet harvesting devices which will permit the harvesting device to be shifted upwardly but will normally maintain the same in ground contact.

It a further object of applicant's invention to provide a cushioning mounting device for beet harvesting devices which will permit at least limited vertical shifting of the same but which will maintain the lateral position of the same during any vertical shifting of the same.

It is still a further object of applicant's invention to provide a mounting device for beet harvesting equipment to provide positive attachment means for the same to a tool bar.

These and other objects and advantages of applicant's invention will more fully appear from the following disclosure made in connection with the accompanying drawings in which the same numeral or indicia is used to indentify the same or similar parts throughout the several views, and in which.

Figure 1:
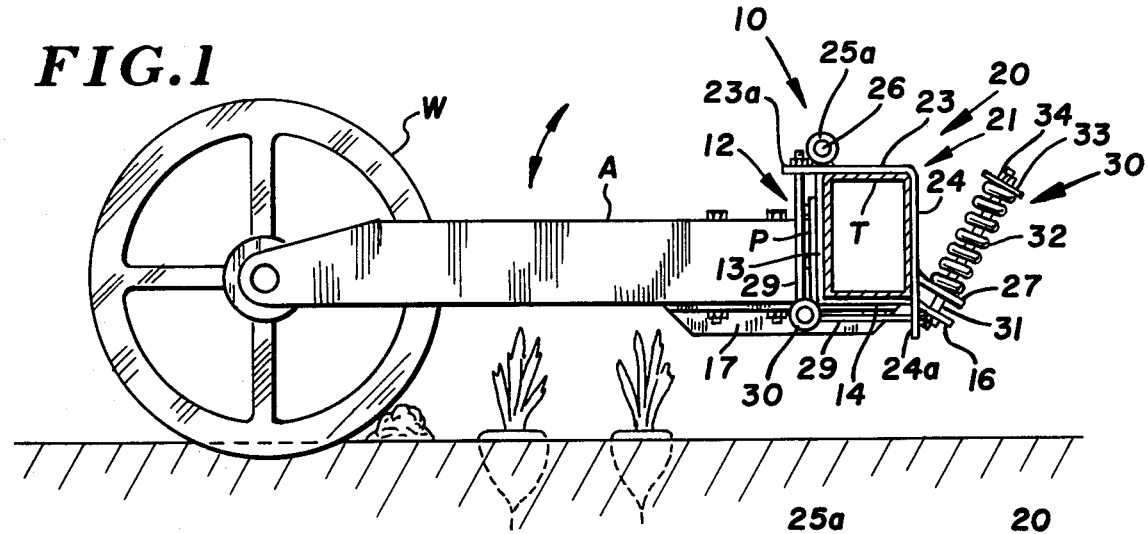
FIG. 1 is a side elevation of typical installation of applicant's beet harvester mounting device illustrating the same upon a tool bar and in which the tool bar is illustrated in section.
Figure 2:
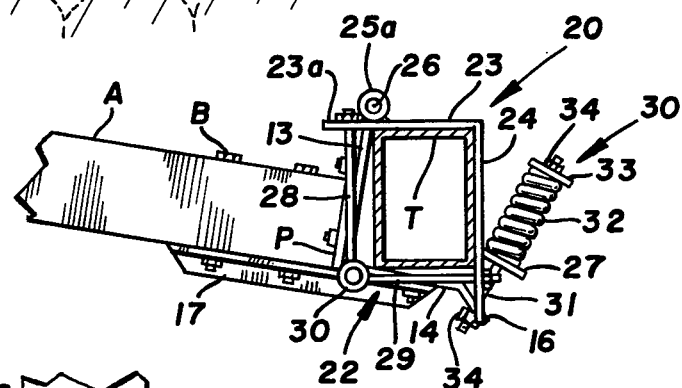
FIG. 2 is a view similar to a portion of FIG. 1 in which the harvester carrying bar is illustrated in an elevated or vertically shifted position as would occur if the harvester wheels had struck an object.

In accordance with the accompanying drawings, applicant's mounting device is generally designated 10 and is provided to attach the beet harvester unit to a tool bar T. The tool bar in turn is attached to a pulling unit such as a tractor and the tool bar extends transversely to the motion of the unit such that a plurality of harvesting devices may be towed thereby. The harvester includes a mounting or attachment arm A which normally is of a rectangular configuration and has means for mounting the harvesting wheels W thereon. The tool bar T is, as in the form shown, of a rectangular configuration, although, it should be understood, that the particular configurations of the mounting or attachment arm are not controlling to the invention provided by the applicant.

The mounting device 10 provides a first L-shaped bracket 12 attachable to the forward end E of the attachment arm A and in the form shown, consists of a vertical leg 13 and a horizontal leg 14. The vertical leg 13 is provided with a horizontally disposed housing 15 at the upper end thereof and this housing is provided with a passage there through to permit pivotaly mounting to the remainder of the unit as will be described hereinafter. The width of the vertical leg 13 is substantially equal to the width of this housing 15 for purposes as will be described hereinafter. The horizontal leg 14 is provided with an angularly arranged lip 16 at the outer end thereof for spring loading of the sections of the device.

To provide for additional support to the first L-shaped bracket, applicant provides an additional attachment element 17 of substantial T-shaped configuration and this element 17 is secured to the lower surface of the horizontal leg 14 of the bracket 12.

Several forms of attachment arm A are available. Certain of the same are provided with an end plate P. In the form shown, the vertical leg 13 of bracket 12 is bolted to this plate P and the T-shaped support element 17 is attached to this arm A through bolts B or the like. Obviously this bracket 12 could be welded to the arm A or could be fabricated thereto in other manners.

The mounting device 10 further provides a pivot providing element 20 which is positionable and removeably attachable about the tool bar T.

Figure 3:
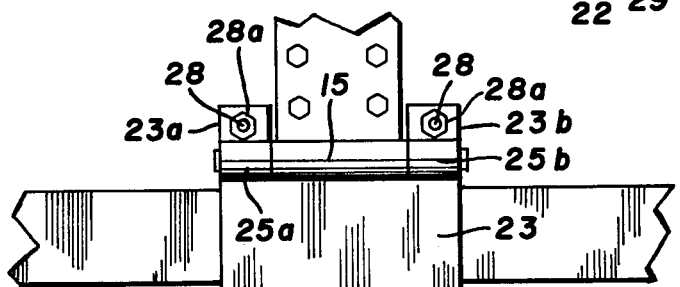
FIG. 3 is a top plan view of the mounting portion of applicant's device.
Figures 4, 5:
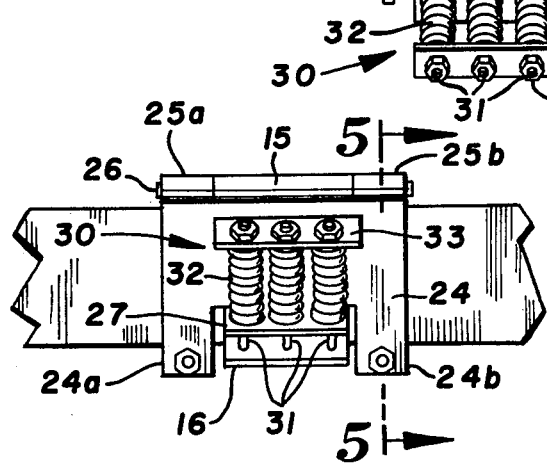
FIG. 4 is a front elevation of applicant's device.
FIG. 5 is a vertical section taken substantially along Line 5—5 of FIG. 4 and particularly illustrating that portion of applicant's device for attachment to the tool bar.

The pivot providing element 20 includes an L-shaped engagement section 21 and attachment means designated in its entirety 22. The L-shaped section 21 includes a horizontal section 23 and a vertical section 24. Each of these sections 23, 24 is provided with a pair of extending legs designated 23a, 23b and 24a, 24b as best illustrated in FIG. 3 and FIG. 4. Arranged on the upper surfaces of legs 23a, 23b are a pair of trunnion members 25a, 25b and when the bracket 20 is provided in positioned relation on the tool bar T the passage through housing 15 of bracket 12 will be in alignment therewith and a pin passing through the trunnions and the passage will permit relative rotation of the bracket 12 to the pivot providing element 20. The pin is designated 26.

An area on the vertical portion 24 of pivot providing section 20 is provided between the lower extending legs 24a, 24b and this area is angularly arranged with respect to vertical and is designated 27.

The attachment means 22, in the form shown includes a pair of threaded rod members 28, 29 which are universally joined as at 30. Such a universal joinder 30 could be accomplished simply by providing rings at the respective ends of the rods 28, 29 and these rings could be interlocked through many various means. The concept of this rod structure is to provide a simple means for attaching the bracket or L-shaped section 21 to the tool bar T and many forms are available to accomplish this joinder but allow the removability of the section 21 and, likewise, the ease of installation obtained through the illustrated structure.

In order to accommodate the threaded members 28, 29, apertures are provided through the extending legs 23a, 23b and 24a, 24b and, using the threaded rods illustrated, nuts 28a, 29a are provided.

With the structure discussed to this point, it should be obvious that the pivot providing element 20 is secured to the tool bar and the harvester arm A is pivotally mounted thereto through the pin 26 received into and through the trunnions 25a, 25b and passing through the passage in housing 15.

As stated, the bracket 12 is provided with and angularly arranged end section 16 and likewise, the pivot providing section 20 is provided with an angularly directed section 27. The angularity of these sections is selected such that when the two brackets 12, 20 and arranged about the tool bar T, these two sections 16, 27 are normally parallel to one another. As was stated, the width of the vertical section 13 of bracket 12 was substantially equal to the width of the housing 15. This will permit the vertical section 13 to move upwardly between the legs 23a, 23b but will be held against lateral movement by such legs during such movement. The angularly directed flange or section 16 of bracket 12 must likewise be receivable between the legs 24a, 24b of the bracket 20. The dimensions of the angular section 16 and the length of the legs 24a, 24b is preferably selected such that the angular section will lie between such legs 24a, 24b during the entire allowable movement of the bracket 12 and the attached arm A.

The cushioning effect is obtained with a plurality of spring strucures operating in conjunction with these angular offset flanges or sections 16, 27. In the form shown, three such springs and associated structure are provided but this number is a matter of choice. To accomodate this cushioning structure, designated in its entirety 30, aligned apertures must be provided through the flanges 16, 27 and, in the form shown a threaded shaft is provided therethrough, designated commonly 31, and a spring 32 is placed over each such spring with a common cover plate 33 being received over the springs 32 and over each of the shafts 31. Closure means such as nuts are provided on the ends of the shafts 31 and the springs are commonly loaded by tightening the same. Obviously, the tension of the springs may be preset by varying the length of the shafts 31 by tightening the nuts 34 and this will modify the total flexibility of movement of the arm A. This spring loaded or cushioning arrangement will return the arm A and the associated picker wheel W to proper picking position should the same be elevated by an obstruction in the field.

During the possible oscillation of the arm A and thus the associated bracket 12, it should be obvious that the entire structure is restrained against lateral movement due to the spacing between the extending legs of bracket 20 and not only will the vertical leg 13 of bracket 12 be held against such lateral movement but also the lower end of bracket 20 is similarly restrained by the spacing of legs 24a, 24b and the width of the angular section 16.

It should also be pointed out that the applicant's device provides a safety feature should sections of his unit fail. With other devices which are attached to a tool bar with U-bolts or the like, the breaking of a U-bolt may easily permit the unit to drop from the tool bar and the forward movement of the propelling vehicle will cause the dropped picker unit to collide with the equipment carried therebehind. With applicant's device, even if both sets of connective elements 28, 29 should fracture, the unit is retained in association to and connected to the tool bar due to the continued functioning of the spring and the location thereof behind the tool bar. The function of the spring will be to hold the two brackets 12 and 20 about the tool bar and not prvent the arm A from leaving this connective relation. If the pin 26 should break for any reason, again the action and location of the spring structure will tend to hold the unit to the tool bar. This consideration is very important as the harvesting and cleaning equipment towed behind the picker wheels is expensive and any damage to the same would result in long delays for harvesting.

It should be obvious that the applicant has provided a unique cushioning mounting directed to the mounting of equipment to tool bars wherein the equipment is held against lateral movement while being permitted at least limited vertical shifting and movement.

What I claim is:

1. A cushioning attachment for attaching harvesting and earth working tools to generally rectangular tool bars and the like for towing the tool, said attachment including:
   a. a first, generally L-shaped member having a vertical leg and a horizontal leg for engaging the rear and bottom of the tool bar respectively and being attachable to the tool;
   b. a second, generally L-shaped member having a vertical leg and a horizontal leg for engaging the front and the top of the tool bar respectively;
   c. means for attaching said second member to said tool bar;
   d. means for rotatably connecting said first and second members, said means being located respectively at the upper edge of said vertical leg of said first member and the rearwardly directed end of said second member; and, e. biasing means connecting selected portions of said first and second members, said biasing means being arranged and positioned on the side of the tool bar opposite said means for rotatably connecting the same.

2. The structure set forth in claim 1 and said means for rotatably connecting said first and second members permitting relative vertical movement of said first member with respect to the second member and the tool bar.

3. The structure set forth in claim 2 and means for preventing lateral movement of said first member with respect to said second member.

4. The structure set forth in claim 3 and said means for preventing lateral movement including rearwardly extending leg members on said horizontal leg of said second member, said first member being vertically shiftable between said leg members.

5. The structure set forth in claim 1 and said horizontal leg of said first member being provided with a forwardly extending flange portion and said vertical leg of said second member being provided with a forwardly extending flange, said biasing means normally urging said flanges into parallel relation.

6. The structure set forth in claim 5 and said biasing means including a first shaft member arranged to pass through said flanges of said first and second members and abutting with one surface of one of said flanges, and longitudinally extending compression spring members arranged to abut with one surface of the other of said flanges to normally urge said flanges into parallel relation.

7. The structure set forth in claim 6 and a plurality of biasing means normally urging said flanges into parallel relation.

8. The structure set forth in claim 6 and a pair of spaced, downwardly extending legs provided on said vertical leg of said second member, the width of said flange of said first member being prevented from lateral movement by said legs.

* * * * *